UNITED STATES PATENT OFFICE.

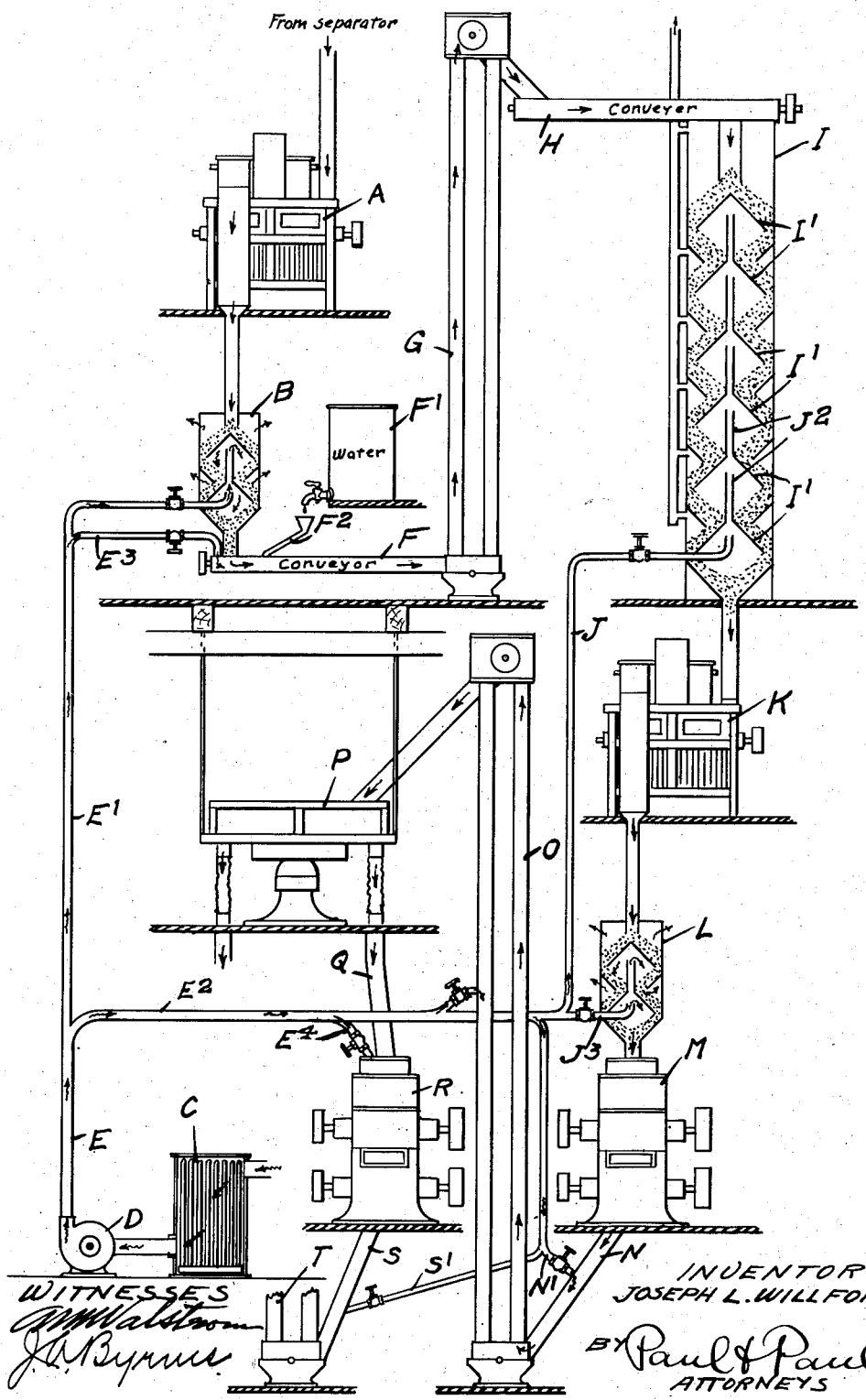

JOSEPH L. WILLFORD, OF GLADSTONE, MICHIGAN, ASSIGNOR OF TWO-FIFTHS TO AMASA C. PAUL, OF MINNEAPOLIS, MINNESOTA.

PROCESS OF PREPARING GRAIN FOR MILLING.

1,061,933.  Specification of Letters Patent.  Patented May 13, 1913.

Application filed April 5, 1910. Serial No. 553,632.

*To all whom it may concern:*

Be it known that I, JOSEPH L. WILLFORD, a citizen of the United States, and resident of Gladstone, in the county of Delta and State of Michigan, have invented certain new and useful Improvements in the Process of Preparing Grain for Milling, of which the following is a specification.

It has been proposed heretofore to bleach flour made from wheat by treating it with nitrogen peroxid, ozone or other gases designed to oxidize the coloring material contained in the flour. These processes are, all of them, objectionable for one reason or another. The use of ozone is objectionable as it usually leaves a disagreeable taint and odor in the flour. The nitrogen peroxid is objectionable as it adulterates the flour and thereby unfits it for human consumption.

The object of my invention is, first, to thoroughly sterilize, clean and condition grain, previous to grinding, by means of moisture and heated atmospheric air, used in connection with the ordinary cleaning and milling machinery in the flour mill. Second, to treat the chop with heated atmospheric air after each reduction and before the chop goes to the following separating or bolting machines.

I find that by this process, I am enabled to oxidize the coloring material in the grain and also to very largely increase the yield of high grade, or as it is usually called, patent flour. In fact, by my process, instead of producing from sixty per cent. to eighty per cent. of patent flour, and from twenty per cent. to forty per cent. of baker's or low-grade flour, I am able to make the entire flour product into high-grade or patent flour, and to do this without the use of deleterious gases or other poisonous substances. This process also leaves the bran and offal in a sweet and wholesome condition suitable for feed for live stock.

My invention consists generally in various steps and in the method or process hereinafter described and particularly pointed out in the claim.

The drawing, forming part of this specification, is a vertical section of certain portions of a flour mill showing an arrangement of machinery therein and showing an arrangement of apparatus for carrying out my process.

In carrying out my invention, I take the grain from the separator and pass it to a suitable scourer A, from which it is passed into a heating tank B, where it is subjected to a current of air of high temperature, and is held therein until it has reached the temperature desired which I have usually found to be about 140 degrees Fahrenheit. The heated air is preferably supplied through a radiator C, being drawn through the casing of the radiator by a suitable fan D. From the fan D, the heated air is driven to the pipe E and the branch pipes $E^1$ and $E^2$, and it may also be driven to any additional number of pipes or branch pipes. The air from the branch pipe $E^1$ enters the grain heating and conditioning tank B, and, while the grain is held therein, the heated air from this pipe, passing into the casing, thoroughly heats the grain and raises it preferably to a temperature of about 140 degrees. From the heating tank B, the grain passes into a spiral or other suitable conveyer F, and in order that the grain may be properly treated while in this conveyer, a branch pipe $E^3$ is preferably provided in connection with the pipe $E^1$ which conducts the hot air to the head of the conveyer. I also preferably provide means, such as a water tank $F^1$, and a conductor $F^2$ for supplying water to the head end of the conveyer F, so that said grain is moistened or wet as it passes through the conveyer F. From the conveyer F, the grain passes to a suitable elevator G and from this it is carried up and discharged into a suitable conveyer H from which it is discharged into a tempering tank I. This tank is provided with a series of deflecting cones $I^1$ and the heated air from the pipe $E^2$ is conducted into the lower part of the tank I by means of a pipe J, and passes up beneath the cones by means of a pipe $J^2$.

The grain is preferably held for a considerable time in the tank I, and, if preferred, automatic valves (not shown) may be provided for the purpose of retaining the tank full of grain at all times. From the tank I, the grain is preferably passed to another scourer K, and then to another heating or treating tank L which has deflecting cones similar to those in tank I, and into which the air is conducted by means of a branch pipe $J^3$. From the tank L, the grain passes to a set of rolls M, and from these rolls, through the conductor N to an elevator O by which it is carried up and discharged to a plansifter or other suitable separator P. From this plansifter P, the chop passes through a conductor Q to another set of rolls R, and from these rolls it may pass through a conductor S to an elevator T. Branch pipes N¹ and S¹ preferably lead from the pipe E² to the conductors N and S, and, if preferred, a pipe E⁴ may lead from the pipe E² into the top of the roll casing R. It will be seen that after the grain is scoured, it is first given a thorough heating and raised to quite a high temperature, then it is subjected to water in the wetting conveyer F, and, after it is suitably wet, it is passed into the tempering tank I in which it is preferably held for a period of six to nine hours, and while in this tank it is subjected to a current of hot air which is passed into the lower part of the tank through the pipe J. This current of hot air, passing through the moist grain, thoroughly sterilizes it and being then followed by the scourer K, all objectionable odors, smut and mold on the grain will be eliminated. It then passes preferably to another tempering tank, and then to the first break rolls. After the first break, the chop is subjected to a current of heated air, and either before or after each succeeding reduction, and prior to passing to the sifter or bolter, each stream of chop is again subjected to a further current of hot air. I have shown in the drawings only two sets of rolls adapted for making two breaks, but it will be understood that the process may be continued throughout any number of desired reductions and I prefer to apply the heated air to the chop, as before stated, either before or after each reduction and prior to the succeeding separation. By treating the chop in this manner, the material grinds and bolts or separates more freely, granulates better, and enables me to obtain a greater yield or more flour from a bushel of wheat.

By using hot air and blasting it through the grain, the moisture in the grain will be evenly distributed as, in the case of an uneven distribution of moisture, the moisture will be drawn from the grain that is too damp and delivered to the grain that is too dry, and the grain will thereby be uniformly tempered and will grind evenly, and the fibrous material from the different reductions will not be cut up. By blasting the hot air through the grain before the first break, the grain is thoroughly sterilized and all odors which arise from the surface of the grain or from any of the material adhering thereto will be removed, and as the vent pipes from the tank may be extended out of doors, these odors may be entirely eliminated, while, as without my process, such odors are usually absorbed by the flour to the great injury thereof.

From the above it will be apparent that I have provided a process of preparing grain for milling wherein the grain is progressively treated in a continuous path of movement. By this, I mean that the grain passes through each step in the process by one increment after another, and from one step in the process to the next step in counter-distinction to the treatment of the grain in bulk in the several steps of the treatment. It is through this progressive treatment of the grain and the passing of the same directly from one step to another in a connected path that the functions above stated are secured.

By this process I oxidize the coloring matter in the grain and I convert the entire flour producing part of the wheat into high-grade or patent flour. I increase the value of the flour materially, and instead of producing sixty per cent. to eighty per cent. of high-grade or patent flour, and twenty per cent. to forty per cent. of baker's and low-grade flour, I produce one hundred per cent. of high grade or patent flour and also leave the bran and fibrous material in a desirable condition to be used as feed for animals.

I claim as my invention:—

The process of preparing grain for milling, comprising heating the grain, subjecting the same to moisture while heated, and subjecting said grain while heated and moistened to a current of heated air for a considerable period of time, progressively in a continuous path of movement.

In witness whereof I have hereunto set my hand this 30th day of March, 1910.

JOSEPH L. WILLFORD.

Witnesses:
L. C. CRONIN,
J. A. BYRNES.